July 12, 1966  L. G. TRIMMER  3,260,815
FLOAT TYPE FLOW RESPONSIVE SWITCH WITH FLOW RESISTANCE
MEANS IN FLOAT CHAMBER OUTLET
Filed Feb. 24, 1964

INVENTOR.
LEA G. TRIMMER
BY
Fishburn & Gold.
ATTORNEYS

United States Patent Office 3,260,815
Patented July 12, 1966

3,260,815
FLOAT TYPE FLOW RESPONSIVE SWITCH WITH FLOW RESISTANCE MEANS IN FLOAT CHAMBER OUTLET
Lea G. Trimmer, 504 Campbell, Kansas City, Mo.
Filed Feb. 24, 1964, Ser. No. 346,922
3 Claims. (Cl. 200—81.9)

This invention relates to pressure-actuated control devices, and more particularly to such devices which operate in response to variations in liquid flow rate.

In certain applications, it is highly desirable to actuate a switch or other control device in response to a variation in liquid flow rate. For example, when recovering liquids during a condensation step it may be economically feasible to continue the process only so long as a minimum recovery rate is maintained. By metering the liquid flow in such a manner that a signal is produced when the flow rate drops below the minimum, further steps can be initiated at the desired instant.

Such flow metering devices have been suggested, for example, see my co-pending patent application, Serial No. 263,523, filed March 7, 1963, wherein the device uses pressure variations on a flexible diaphragm to reciprocate a tapered needle valve member in response to flow rate, the needle valve member being associated with a switch operating device for producing a signal when a predetermined flow rate is sensed. Such diaphragm-operated devices are satisfactory in many applications; however, in some instances diaphragm flutter presents a problem or, if a liquid containing solid or semi-solid particles such as a slurry is being metered, the orifice or control opening around the needle valve member may become clogged.

The principal objects of the present invention are: to provide a sensitive signal producing device which is responsive to variations in flow rate; to provide a flow meter switch which does not depend upon pressure reacting against a flexible diaphragm for operation; to provide such a flow meter switch which is well adapted to handle slurries or other flowable liquids having solid or semi-solid particles contained or suspended therein; to provide such a control device which is easily adjusted for actuation in response to various flow rates; to provide such a flow meter switch which may be rendered responsive to extremely small variations in flow rates; and to provide such a device which is simple in construction, accurate and repeatable in response and rugged and long-lived in use.

Other objects and advantages of this invention will become apparent from the following description taken in connection with the accompanying drawings wherein are set forth by way of illustration and example certain embodiments of this invention.

Figure 1:
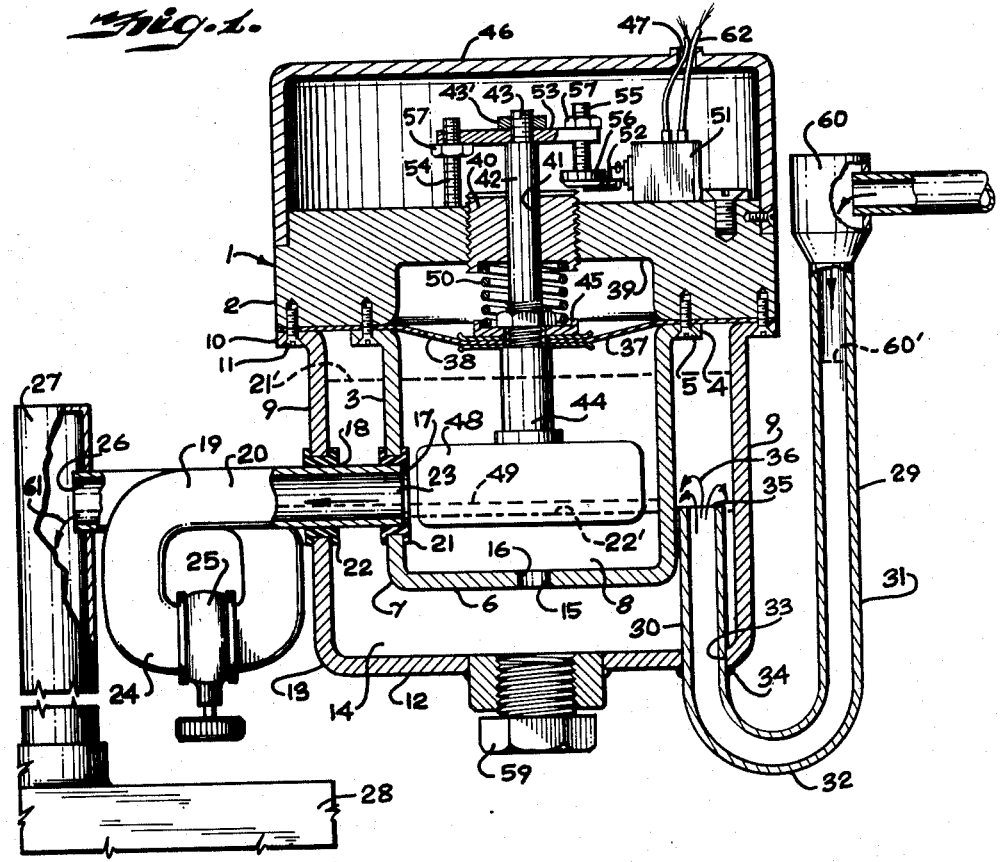
FIG. 1 is a vertical cross-sectional view through a float operated flow meter switch embodying this invention showing the internal construction thereof.
Figure 2:
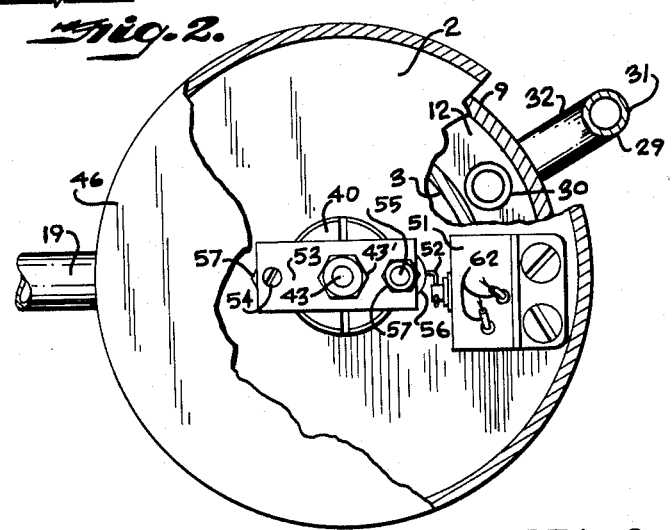
FIG. 2 is a top view of the flow meter switch with portions broken away to show normally hidden parts.

Referring to the drawings in more detail:

The reference numeral 1 generally indicates a flow-responsive switching device embodying this invention. The device 1 comprises a horizontally extending mounting plate or supporting member 2, in the illustrated example, of circular configuration. A depending inner cylindrical side wall 3 is secured at the upper end thereof to the supporting member 2 by means of an annular lip 4 through which screws 5 extend, the screws 5 being threadedly received upwardly into the supporting member 2. An inner bottom wall 6 is continuous with the inner side wall 3 and forms therewith an inner shell 7 having a liquid-receiving inner chamber 8 therein. A depending outer side wall 9 is secured at the upper end thereof to the supporting member 2 by a lip 10 and screws 11 in a similar manner to the inner side wall and is spaced radially outwardly therefrom. An outer bottom wall 12 is continuous with the outer side wall 9 and is spaced downwardly from the inner bottom wall 6. The outer side wall 9 and outer bottom wall 12 form an outer shell 13 surrounding the innner shell 7 and define an outer liquid-receiving chamber 14 surrounding the inner chamber 8. An orifice or opening 15 extends through the inner botttom wall 6 forming a liquid flow passageway 16 communicating between the inner chamber 8 and outer chamber 14. The passageway 16 is large in size so as not to present significant resistance to flow therethrough.

Inner and outer horizontally aligned openings designated 17 and 18 respectively extend through the inner and outer side walls 3 and 9 and are vertically positioned between the underside of the supporting member 2 and the inner bottom wall 6. An outlet tube 19 has a horizontal portion 20 extending through the aligned opening 17, past the outer chamber 14, and through the opening 18. The portion 20 forms, with suitable grommets 21 and 22, seal connections with the outer and inner side walls. The portion 20 opens at 23 into the inner chamber 8. The outlet tube 19 is positioned to drain the inner chambers 8 and 14, for example, from a high liquid level 21' to a low liquid level 22'.

The outlet tube 19 is adapted to exert a suitable resistance to liquid flow therethrough. This resistance is exerted, in the illustrated example, by a loop 24 in the outlet tube 19 and a suitable restrictive member in the form of a flow valve 25 therein which is adjustable so as to vary the cross-sectional area of the free passageway through the tube. The outlet tube 19 terminates in an outlet opening 26 located at the same level as the opening 23 although this is not essential so long as proper drainage is obtained. As noted further below, a resistance to flow in the outlet tube 19 is maintained so that a level variation results in the inner chamber 8 in response to variations in output flow through the outlet tube. The outlet opening 26 may communicate with a suitable fluid-directing pipe 27 which, in turn, opens into a storage tank 28 from which the recovered liquid may be taken for further processing or the like, depending upon the circumstances.

An inlet tube 29 has a vertically extending inner leg 30 and a vertically extending outer leg 31 joined in a U connection 32 spaced below the outer bottom wall 12. An opening 33 extends through the bottom outer wall 12 and receives the inner leg 30 which extends vertically therethrough and forms a seal connection therewith, for example, by welding at 34. The inlet tube inner leg 30 extends upwardly within the outer chamber 14 and opens at 35 within the outer chamber between the inner and outer side walls 3 and 9. The relative position of the opening 35 preferably but not necessarily corresponds to the lowermost portion of the opening 23. The opening 35, however, should be between the side walls 3 and 9 to isolate the turbulence of the incoming liquid 36 from the inner chamber 8.

A horizontally extending flexible diaphragm 37 is secured between the supporting member 2 and the upper ends or lips 4 and 10 of the inner and outer side walls 3 and 9. The diaphragm 37 extends across the inner chamber 8 and contains, in the illustrated example, a suitable bleed hole 38 through which pressure in the chamber 8 may be equalized with outside atmospheric pressure through a path noted hereafter. An upwardly extending depression 39 is located in the supporting member 2 directly over the inner chamber 8 permitting the flexible diaphragm 37 to move freely upwardly thereinto as well as downwardly into the inner chamber 8.

A collar member 40 is threadedly engaged in the supporting member 2 and located above the inner chamber 8 and over the diaphragm 37. The collar member 40 has a vertically extending passageway 41 slidably receiving a vertical rod 42 having an upper threaded portion 43 and a lower portion 44. The vertical rod 42 slidably extends downwardly through the passageway 41 and engages the diaphragm 37 by means of an anchor member 45 which fixes the rod to the central portion of the diaphragm for vertical motion together. The clearance between the rod 42 and the passageway 41 is such that a gas at greater than atmospheric pressure in the inner chamber 8 may pass through the bleed hole 38 and upwardly between the rod 42 and passageway 41 for escape into a cover or cap 46. The gas may then escape through an electrical wire lead opening 47 or the like.

The rod 42 extends downwardly through the diaphragm 37 and into the inner chamber 8 terminating at the lower portion 44 thereof in a float member 48 secured thereto and vertically movable therewith in response to variations in actual fluid level 49. A helical spring 50 bears at opposite ends thereof on the anchor member 45 and the collar member 40 and cooperates with the flexible diaphragm 37 to resiliently axially urge the rod 42 into a position for normally supporting the float member 48 above the inner bottom wall 6.

An electrical switch 51 is mounted on the upper side of the supporting member 2 and is of the type having an actuating arm 52 responsive to vertical reciprocal motion for switch operation. A T-bar member 53 is rigidly secured intermediate the ends thereof to the rod upper portion 43 by means of a nut 43' for moving vertically with the rod. One end of the T-bar member 53 has a vertically extending stud 54 threadedly engaged therewith for vertical adjustment with respect thereto. The stud 54 is adapted to engage the supporting member 2 to limit the downward motion of the rod 42. The other end of the T-bar 53 has a vertically extending screw 55 threadedly engaged therewith for vertical adjustment with respect thereto. The screw 55 terminates at the lower end thereof in an enlarged head 56 engaging the actuating arm 52 to impart vertical motion to the arm in response to variations in vertical position of the float member 48. Suitable lock nuts 57 are engaged with the stud 54 and screw 55 to maintain the desired adjusted position thereof. It is noted that the vertical position of the collar member 40 may be varied by rotation with respect to the supporting member 2 for varying the downward pressure exerted on the rod 42 by the helical spring 50. A suitable removable plug 59 is provided in the outer lower wall 12 for draining the device 1 as required.

By way of operation, the liquid to be metered is introduced into a suitable receiver 60 from which it pours into the inlet tube outer leg 31 maintaining a variable level 60' therein depending upon flow rate. The entering liquid travels through the inlet tube 29 and exits, generally with turbulence, at 35 in the outer chamber 14. The liquid then passes through the passageway 16 into the inner chamber 8 with minimum turbulence and seeks a variable liquid level 49 within the inner chamber 8. The height of the level 49 is a function of the flow rate through the outlet tube 19 since resistance to liquid flow through the outlet tube varies directly with flow rate. In other words, exceeding a certain flow rate into the chamber produces a rate of level increase proportionally greater than the the flow rate increase into the chamber and decreasing the flow into the chamber below a certain rate produces a rate of level decrease proportionally greater than the flow rate decrease into the chamber. The result is a liquid level in the chamber which is quite sensitive to slight increases and decreases in flow rate at predetermined levels of flow. The variation in the liquid level 49 causes a variation in the vertical position of the float member 48 and, so long as exit flow 61 is above a certain predetermined minimum, the switch 51 will, in this example, remain unactuated. When, however, the exit flow at 61 falls below the predetermined minimum, the float member 48 will lower to a position which will result in the actuation of the switch 51, signalling through suitable conductors 62 that this condition has been reached. It is to be understood that the switch 51 may be chosen to produce a signal upon a predetermined maximum flow or both a minimum and maximum flow, etc., if desired. The above-described device 1 may be constructed for extreme sensitivity, for example, for operation in response to a pressure variation of one or two inches of perchloroethylene.

The device, due to the lack of a tapered needle valve or the like, easily handles slurries or liquids containing solid or semi-solid particles without danger of clogging and without significant alteration in sensitivity. Since the diaphragm is not a pressure-responsive element, there is no problem of diaphragm flutter and, if desired, the diaphragm of the illustrated example may be replaced with any other suitable resilient suspending means without departing from the scope of this invention. In certain applications, it may be desirable to eliminate all resilient supporting or pressure exerting members on the rod 42 and rely entirely upon the action of gravity and the buoyancy of the float member 48 to perform the needed fluid level-responsive reciprocation of the rod. The nature of the device is such that operability is obtained with very little resistance to flow therethrough. Surges common with other types of metering devices are virtually eliminated in favor of smooth flow variations dependent upon the rate of liquid introduction into the device.

It is to be understood that although one form of this invention has been illustrated and described, it is not to be limited to the specific form or arrangement of parts herein described and shown except insofar as such limitations are included in the claims.

What I claim and desire to secure by Letters Patent is:

1. A liquid flow meter for indicating slight changes in flow rate comprising:
    (a) a body forming a chamber, means forming an inlet passageway and an outlet passageway communicating with said chamber, said outlet passageway being positioned with respect to said chamber and continuously open to continuously drain said chamber from a high liquid level to a low liquid level,
    (b) means forming a pressure variable resistance to outlet flow through said outlet passageway which decreases as flow rate decreases and increases as flow rate increases producing a proportionally more rapid decrease and increase in liquid level in said chamber than change in flow rate into said chamber,
    (c) a member contained in said chamber and responsive to said decrease and increase in liquid level, and
    (d) means associated with said member and controlled thereby for producing a signal in response to a predetermined change in said liquid level.
2. The device as set forth in claim 1 wherein:
    (a) said means forming a resistance comprises a loop in said outlet passageway forming means.
3. The device as set forth in claim 1 wherein:
    (a) said means forming a resistance comprises a flow valve in said outlet passageway forming means.

References Cited by the Examiner
UNITED STATES PATENTS

| | | | |
|---|---|---|---|
| 1,424,756 | 8/1922 | Dean et al. | 137—202 |
| 1,787,132 | 12/1930 | Orsdale | 200—84 X |
| 2,658,581 | 11/1953 | Rider | 137—202 |
| 2,791,964 | 5/1957 | Reeve | 200—84 |
| 2,894,092 | 7/1959 | MacGriff et al. | 200—84 |
| 2,897,913 | 8/1959 | Hudson | 137—202 X |

BERNARD A. GILHEANY, *Primary Examiner.*

H. M. FLECK, *Assistant Examiner.*